(12) United States Patent
Nishimura et al.

(10) Patent No.: US 6,707,277 B2
(45) Date of Patent: Mar. 16, 2004

(54) METHOD OF CONTROLLING CLAW-POLE SYNCHRONOUS MACHINE

(75) Inventors: Shinji Nishimura, Tokyo (JP); Tsunenobu Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 4 days.

(21) Appl. No.: 09/983,916

(22) Filed: Oct. 26, 2001

(65) Prior Publication Data

US 2002/0084773 A1 Jul. 4, 2002

(30) Foreign Application Priority Data

Nov. 1, 2000 (JP) ........................................ 2000-334595

(51) Int. Cl.[7] ............................ H02H 7/06; H02P 11/00; H02P 9/00
(52) U.S. Cl. ............................ 322/29; 322/17; 322/27; 322/28
(58) Field of Search ............................ 322/29, 17, 25, 322/27, 28, 59, DIG. 2

(56) References Cited

U.S. PATENT DOCUMENTS

| | | | |
|---|---|---|---|
| 4,426,613 A | * | 1/1984 | Mizuno et al. ................ 322/21 |
| 4,467,267 A | * | 8/1984 | Hucker et al. ................ 322/61 |
| 4,625,160 A | * | 11/1986 | Hucker ........................ 322/32 |
| 4,701,692 A | * | 10/1987 | Takeuchi et al. .............. 322/90 |
| 5,038,095 A | * | 8/1991 | Kirchberg et al. ............. 322/58 |
| 5,170,111 A | * | 12/1992 | Sugiura ....................... 322/29 |
| 5,225,764 A | | 7/1993 | Falater |
| 5,594,322 A | * | 1/1997 | Rozman et al. ............... 322/10 |
| 5,625,276 A | * | 4/1997 | Scott et al. .................. 322/24 |
| 6,252,381 B1 | | 6/2001 | Schenk |
| 6,433,456 B1 | * | 8/2002 | Higashino et al. .......... 310/263 |

FOREIGN PATENT DOCUMENTS

| | | | |
|---|---|---|---|
| DE | 197 33 212 | 2/1999 | |
| DE | 198 49 889 | 5/2000 | |
| JP | 8-182380 | 7/1996 | ............. H02P/6/20 |

OTHER PUBLICATIONS

Patent Abstract of Japan 08–182380 Jul. 12, 1996.

* cited by examiner

*Primary Examiner*—Thanh Lam
(74) *Attorney, Agent, or Firm*—Sughrue Mion, PLLC

(57) ABSTRACT

A method of controlling a claw-pole synchronous machine with enhanced controllability without incurring additional expensiveness. Operation of the claw-pole synchronous machine is controlled through a vector control of an armature voltage and an armature current supplied from an inverter power source in combination with a field current control. When the claw-pole synchronous machine is operated as a generator, the field current is controlled on the basis of a demanded output power and rotation speed of the claw-pole synchronous machine while a field weakening control with the armature current (id) is performed by controlling magnitude and a phase difference angle (Ø) of the armature current (id).

6 Claims, 4 Drawing Sheets

METHOD OF CONTROLLING CLAW-POLE SYNCHRONOUS MACHINE

BACKGROUND OF THE INVENTION

1. Field of the Invention

The present invention relates to a control method for a claw-pole synchronous machine which is designed to be operated as a three-phase generator or a three-phase electric motor. More particularly, the present invention is concerned with a claw-pole synchronous machine controlling method which can ensure enhanced controllability of operation of the claw-pole synchronous machine without incurring any appreciable increase in the size and the cost involved in the implementation thereof.

2. Description of Related Art

In general, the internal combustion engine for a motor vehicle or the like is equipped with a three-phase synchronous machine operated as a generator or a motor. For driving such three-phase synchronous machine by using an inverter-type power supply source, a control method based on a combination of a vector control and a field current control is adopted and well known in the art, as is disclosed in, for example, Japanese Patent Application Laid-Open Publication No. 182380/19996 (JP-A-8-182380).

For better understanding of the concept underlying the present invention, background technique thereof will first be described in some detail.

Figure 6:
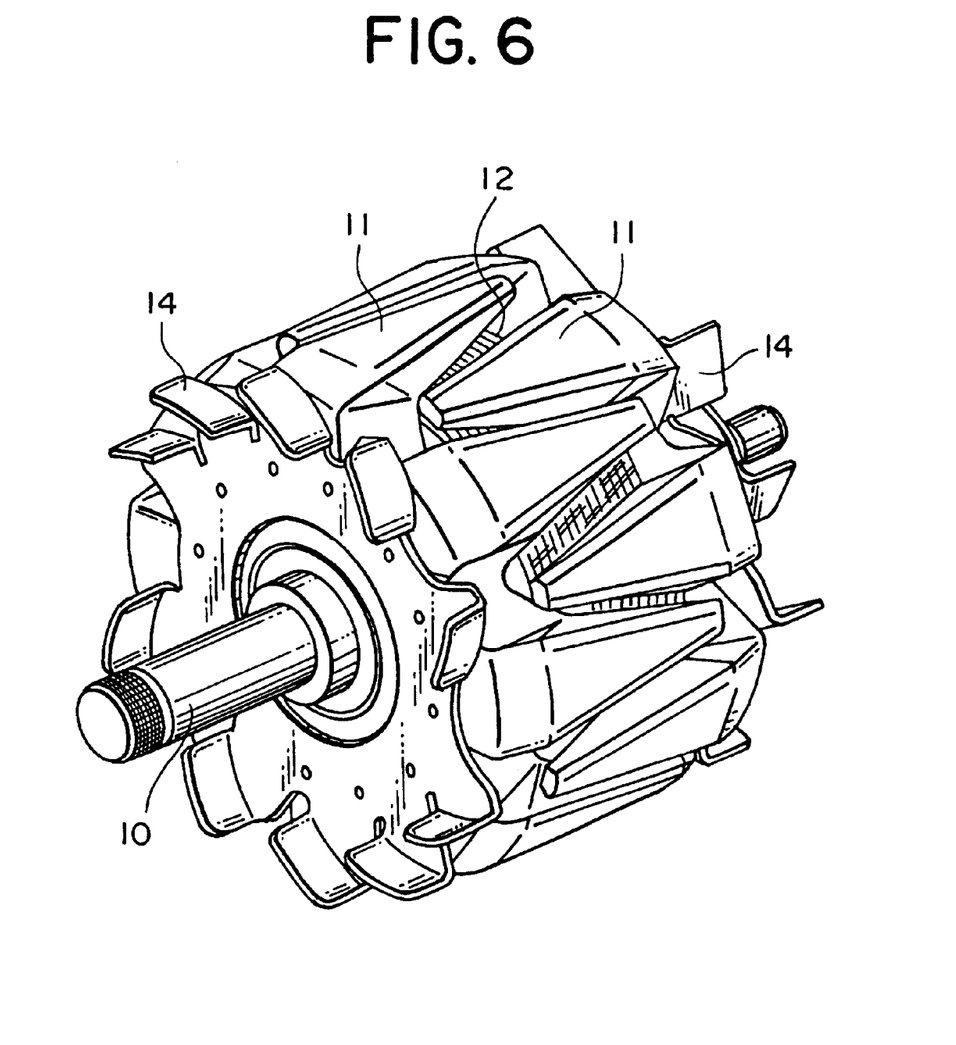
FIG. 6 is a perspective view showing a rotor of a conventional claw-pole synchronous machine.

FIG. 6 is a perspective view showing a rotor of a general claw-pole synchronous machine.

In FIG. 6, the rotor comprises a shaft 10, field poles (claw-poles) 11 and field coils 12, which are formed in one body. Fan blades 14 for cooling the field coils 12 are disposed on periphery of both end surfaces of the rotor respectively.

At first, let's consider the case where the three-phase synchronous machine is operated as a motor (i.e., motor operation mode).

The torque Te generated by the three-phase synchronous machine in the motor operation mode is given by the following expression (1):

$$Te=3\{\Psi \cdot iq+(Ld-Lq)id \cdot iq\} \quad (1)$$

where $\Psi$ represents total flux linkage determined by the field current if, Ld and Lq represent synchronous inductance transformed into d- and q-axis components, respectively, $\Psi \cdot iq$ represents a torque generated by the flux linkage $\Psi$, and the term $(Ld-Lq)id \cdot iq$ represents a reluctance torque, where id and iq represent armature phase currents, respectively, as elucidated below.

Further, the d-axis mentioned above represents the direct-axis direction which coincides with the field pole direction and the q-axis represents the quadrature-axis direction orthogonal to the field pole direction. In this connection, id and iq represent the armature phase currents for the vector control as transformed into the d- and q-axis components (direct- and quadrature-axis components), respectively. The armature phase currents id and iq bear the relation to the armature current i (phase current) which is given by the following expression (2).

$$i^2=id^2+iq^2 \quad (2)$$

The armature current i is three-phase current. However, in the description which follows, it is assumed only for the convenience of description that the armature current i is two-phase current capable of generating a same electromotive force as the three-phase armature current i and represented by the phase current id along the d-axis (direct axis) coinciding with the field pole direction and the phase current iq along the q-axis (quadrature axis) which is orthogonal to the d-axis.

On the other hand, the output power Pg generated by the three-phase synchronous machine in the generator operation mode is given by:

$$Pg=3\{\omega \cdot \Psi \cdot iq+i^2+\omega(Ld-Lq)id \cdot iq\} \quad (3)$$

where $\omega$ represents an electrical angular velocity which corresponds to the rotation speed, and R represents the armature resistance value in each phase. Incidentally, in the expressions mentioned above, the polarities are presumed to be positive in the motor operation mode.

In general, in the case of the synchronous machine of the salient-pole type, it is known that the relation between the synchronous inductances Ld and Lq satisfies the conditions given by the undermentioned expression (4):

$$Ld>Lq \quad (4)$$

Further, in the synchronous machine of the cylindrical-pole type, it is also known that the relation between the synchronous inductances Ld and Lq satisfies the condition given by the following expression (5):

$$Ld=Lq \quad (5)$$

Furthermore, in the synchronous machine of the embedded-pole type, the magnetic permeability in the d-axis direction (NS-pole direction) encompassing the magnet is smaller than the magnetic permeability in the q-axis direction (i.e., direction orthogonal to the NS-pole direction) encompassing magnetic materials such as iron. Thus, the relation between the synchronous inductances Ld and Lq satisfies the following condition:

$$Ld<Lq \quad (6)$$

As can be seen from the expressions (1) and (3) mentioned previously, in the case of the synchronous machines of the salient-pole type and the cylindrical-pole type which satisfy the conditions given by the above-mentioned expressions (4) and (5), respectively, a maximum torque can be produced in the motor operation mode while a maximum output power can be generated in the generator operation mode when the synchronous machine is controlled with the direct-axis current id of zero (id=0) for a same armature current i.

On the other hand, in the case of the synchronous machine of the embedded-pole type satisfying the condition given by the above-mentioned expression (6), a maximum torque can be obtained in the motor operation mode while a maximum output power can be obtained in the generator operation mode when the synchronous machine is controlled with the direct-axis current id of negative polarity (id<0). This direct-axis current id of negative polarity will be referred to as the field weakening current.

By contrast, in the case of the claw-pole synchronous machine which belongs to the salient-pole type synchronous machine, the condition given by the expression (4) is satisfied. Consequently, the control is performed with the direct-axis current id of zero (id=0) and no field weakening control is carried out with the armature current.

By the way, the terminal voltage V of the synchronous machine can be determined in dependence on the rotation speed ω, the flux linkage Ψ between the flux generated by the field current if and the armature coils, the inductance Ld and the resistance R of the armature and given by the following expression (7).

$$V=\sqrt{\{(\omega\cdot\Psi+\omega\cdot Ld\cdot id+R\cdot iq)^2+(\omega\cdot Lq\cdot iq-R\cdot id)^2\}} \quad (7)$$

With the field weakening control with the aid of the armature current mentioned previously, it is intended to mean that the direct-axis current id of the armature is caused to flow in the inverse direction so that the magnetic flux is generated in the opposite direction relative to the counter electromotive force E (=ω·Ψ) of the armature with a view to making it possible to regulate or adjust the terminal voltage V given by the above expression (7) under the control with the inverter.

Accordingly, the armature direct-axis current id is caused to flow in such direction as to produce the magnetic flux in the opposite direction relative to the magnetic field generated by the field current if.

Parenthetically, when the phase difference angle between the counter electromotive force E of the armature and the armature current is represented by Ø, the direct-axis current (d-axis current) id and the quadrature-axis current (q-axis current) iq are given by the following expressions (8) and (9), respectively.

$$id = i \cdot \sin \emptyset \quad (8)$$

$$iq = i \cdot \cos \emptyset \quad (9)$$

Heretofore, in the inverter control of the armature current i in terms of the direct-axis current component id and the quadrature-axis current component iq, the field weakening control with the armature current i is not performed except for the embedded-pole type permanent-magnet synchronous machine exhibiting the inversed salient-pole characteristic.

Such being the circumstances, in the variable speed control of the claw-pole synchronous machine, only the control with the direct-axis current id of zero (id=0), i.e., the control with the armature current i which is in phase with the counter electromotive force E of the armature, is performed and the field weakening control with the armature current is not carried out.

As is apparent from the above, in the conventional claw-pole synchronous machine control known heretofore, the field weakening control based on the regulation of the phase difference angle Ø of the armature current has not been adopted. Consequently, in order to increase the torque or the output power of the claw-pole synchronous machine, it is required to increase correspondingly the field current or the armature current. This however means that the claw-pole synchronous machine has to be implemented in a large size or scale with the power supply capacity also being increased, giving rise to a problem which remains to be solved.

SUMMARY OF THE INVENTION

In the light of the state of the art described above, it is an object of the present invention to solve the problem mentioned above by providing an improved method of controlling a claw-pole synchronous machine which can ensure enhanced controllability of operation of the claw-pole synchronous machine without incurring additional expenditure.

In view of the above and other objects which will become apparent as the description proceeds, there is provided according to an aspect of the present invention a method of controlling a claw-pole synchronous machine through a combination of a vector control of an armature voltage and an armature current supplied from an inverter power source in combination with a field current control, wherein when the claw-pole synchronous machine is operated as a generator, the field current control is performed on the basis of a demanded output power and rotation speed of the claw-pole synchronous machine while the field weakening control with the armature current is performed by controlling magnitude of the armature current and a phase difference angle thereof.

In a preferred mode for carrying out the method of controlling the claw-pole synchronous machine which is to be operated as the generator, as mentioned above, a command value map may be previously prepared for storage in which magnitudes of the field current and the armature current of the claw-pole synchronous machine are stored in association with a command value for the phase difference angle of the armature current in correspondence to the demanded output power and rotation speed of the claw-pole synchronous machine, and the magnitudes of the field current so that the armature current caused to flow through the claw-pole synchronous machine and the command value for the phase difference angle of the armature current can be determined by referencing the command value map.

In another preferred mode for carrying out the method mentioned above, the command value for the phase difference angle of the armature current to be stored in the command value map may be set to a value which allows the demanded output power to be generated with a maximum efficiency.

According to another aspect of the present invention, there is provided a method of controlling a claw-pole synchronous machine through a vector control of an armature voltage and an armature current supplied from an inverter power source in combination with a field current control, wherein when the claw-pole synchronous machine is operated as a motor, the field current control is performed on the basis of a demanded torque to be produced and a demanded rotation speed of the claw-pole synchronous machine while realizing a field weakening control with the armature current by controlling magnitude of the armature current and a phase difference angle thereof.

In a preferred mode for carrying out the method of controlling the claw-pole synchronous machine which is to be operated as the electric motor, as mentioned above, a command value map may be previously prepared for storage in which magnitudes of the field current and the armature current of the claw-pole synchronous machine are stored in association with a command value for the phase difference angle of the armature current in correspondence to the demanded torque and rotation speed of the claw-pole synchronous machine so that the magnitudes of the field current and the armature current to be supplied to the claw-pole synchronous machine and the command value for the phase difference angle of the armature current can be determined by referencing the command value map.

In still another preferred mode for carrying out the method mentioned just above, the command value for the phase difference angle of the armature current to be stored in the command value map may be set to a value which allows the demanded torque to be generated with a maximum efficiency.

By virtue of the claw-pole synchronous machine controlling method according to the present invention described above, it is possible to control the claw-pole synchronous machine with enhanced control performance without incurring any appreciable additional expenditure in respect to the structure of the claw-pole synchronous machine and the inverter power supply circuit therefor.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding things throughout the several views.

Embodiment 1

Figure 1:
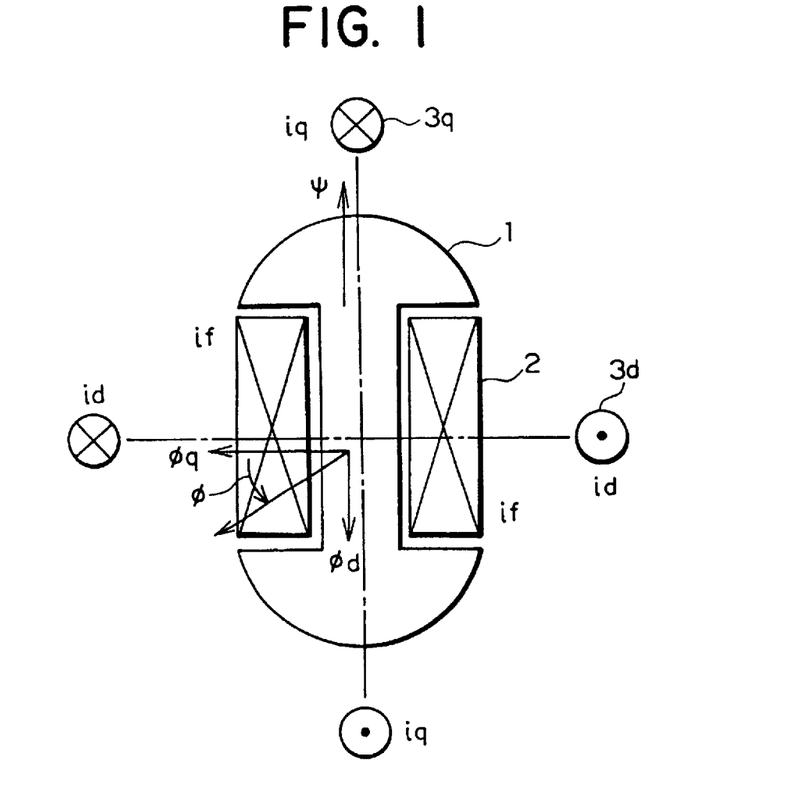
FIG. 1 is a view showing only schematically and generally a structure of a claw-pole synchronous machine to which a first embodiment of the present invention can be applied.

FIG. 1 is a view showing only schematically and generally a structure of a claw-pole synchronous machine to which a first embodiment of the present invention can be applied.

Referring to the figure, the claw-pole synchronous machine includes a field system 1 which is implemented as a rotor. For the purpose of simplification of the illustration, the field system 1 is shown as having only two magnetic poles. The field system 1 includes a field coil 2 which is wound around a core which constitutes a part of the field system 1 and to which a field current if is supplied for exciting the field system 1 to thereby generate magnetic flux Ψ in the d-axis direction (i.e., direct-axis direction).

The claw-pole synchronous machine further includes armature coils 3d and 3q which are implemented as the constituent parts of a stator disposed around the field system 1. The armature coil 3d for the direct axis or d-axis (also referred to as the d-axis armature coil 3d) is adapted to generate magnetic flux Ød upon energization with an armature current id (d-axis armature current) for weakening the magnetic field, while the armature coil 3q for the quadrature axis or q-axis (also referred to as the q-axis armature coil 3q) generates magnetic flux Øq upon energization with an armature current iq (q-axis armature current).

The magnetic fluxes Ød and Øq generated by the d- and q-axis armature coils 3d and 3q, respectively, are synthesized to magnetic flux having a phase difference angle Ø relative to the q-axis. The synthesized or combined magnetic flux coacts with the field system 1 to thereby generate a torque or electric power in the motor or generator operation mode.

In conjunction with the claw-pole synchronous machine described above, the present invention teaches that when the claw-pole synchronous machine is operated as a generator (generator operation mode), the field current is controlled on the basis of a demanded output power and rotation speed of the claw-pole synchronous machine while realizing the field weakening control with the armature current by controlling the magnitude and the phase difference angle Ø of the armature current.

In this conjunction, the present invention further teaches to prepare in advance for storage a command value table or map in which the magnitudes of the field current and the armature current of the claw-pole synchronous machine are stored in association with the command value for the phase difference angle Ø of the armature current in correspondence to the demanded output power and rotation speed of the claw-pole synchronous machine, so that the magnitudes of the field current and the armature current caused to flow through the claw-pole synchronous machine and the command value for the phase difference angle Ø can be determined by referencing the command value map mentioned above.

On the other hand, when the claw-pole synchronous machine is operated as a motor (i.e., in the motor operation mode), the present invention teaches that the field current is controlled on the basis of a demanded torque to be outputted and rotation speed of the claw-pole synchronous machine while realizing the field weakening control with the armature current by controlling the magnitude and the phase difference angle of the armature current.

In that case, the present invention proposes to prepare in advance for storage a command value table or map in which the magnitudes of the field current and the armature current of the claw-pole synchronous machine are stored in association with the command value for the phase difference angle Ø of the armature current in correspondence to the demanded torque to be generated and rotation speed of the claw-pole synchronous machine, so that the magnitudes of the field current and the armature current to be supplied to the claw-pole synchronous machine and the command value for the phase difference angle can be determined by referencing the command value map mentioned above.

In this conjunction, when the claw-pole synchronous machine is to be operated as the generator, the command value for the phase difference angle of the armature current should be set to a value at which the demanded output power can be generated with a maximum efficiency, while when the claw-pole synchronous machine is to be operated as the motor, the command value for the phase difference angle of the armature current should be set to a value at which the demanded torque can be produced with a maximum efficiency.

Figure 2:
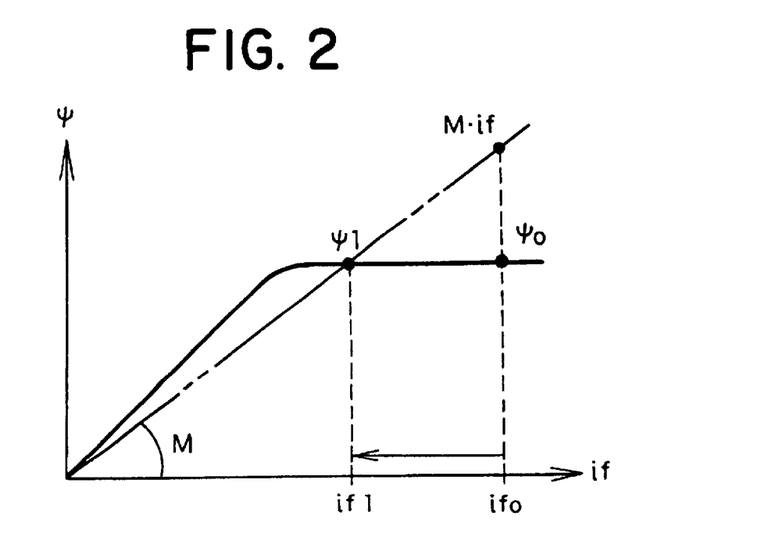
FIG. 2 is a view for graphically illustrating operation characteristics in the case where the claw-pole synchronous machine is operated as an electric motor under a field weakening control according to the first embodiment of the invention.

Now, reference is made to FIG. 2 which is a view for graphically illustrating the operation characteristics in the case where the claw-pole synchronous machine is operated as the motor under the field weakening control. In the figure, the field current if is taken along the abscissa with the flux linkage Ψ in the d-axis direction (direct-axis direction) being taken along the ordinate. As can be seen in FIG. 2, the flux linkage $\Psi$ becomes saturated at a predetermined level of the field current if.

In FIG. 2, reference symbol M denotes mutual inductance of the field coil 2 and the armature coils 3 (3d and 3q), ifo and $\Psi$o designate flux operating points, respectively, when the field weakening control is invalidated (i. e., when id=0), if1 and $\Psi$1 designate flux operating points, respectively, in the state where the field weakening armature current id is being fed (i.e., when id<0), and M·if designates apparent or virtual flux linkage which can be determined in accordance with the linear characteristic (slope of the mutual inductance M) from the operating point of the flux linkage $\Psi$1.

Next, referring to FIGS. 1 and 2, description will concretely be made of the field weakening control method according to the first embodiment of the present invention on the presumption, by way of example, that the claw-pole synchronous machine is operated as the motor.

At first, referring to FIG. 2, the torque Te (regarded as being of single-phase only for the convenience of description) produced by the claw-pole synchronous machine (in the motor operation mode) due to the flux linkage $\Psi$o when the armature current id is zero can be given by the following expression (10) in view of the expression (1):

$$Te=\Psi o \cdot iq \quad (10)$$

When the field weakening armature current id of negative polarity is caused to flow, the flux linkage in the magnetic circuit takes the value $\Psi$1 shown in FIG. 2 but remains to be $\Psi$o in appearance or virtually. Thus, the torque Te can be given by the following expression in view of the expression (11).

$$Te=\Psi o \cdot iq+(Ld-Lq)id \cdot iq \quad (11)$$

As is apparent from the above expression, so long as Ld−Lq=0, the reluctance torque remains unchanged regardless of the armature current id, which means that the torque Te as generated assumes the same value given by the expression (10).

At this juncture, when the field current if is fed to the field coil 2, the flux linkage $\Psi$f can be given in view of the mutual inductance M between the field coil 2 and the armature coil 3 as follows:

$$\Psi f=M \cdot if \quad (12)$$

From the above expression (12), the mutual inductance Mo for the d-axis armature current id of zero (id=0) is given by the following expression (13).

$$Mo=\Psi o/if \quad (13)$$

Thus, by rewriting the expression (10) while taking into account the above expression (13), the torque Te generated when the d-axis armature current id is zero (id=0) can be expressed as follows:

$$Te=Mo \cdot if \cdot iq \quad (14)$$

On the other hand, when the d-axis armature current id of negative polarity is caused to flow, the mutual inductance M1 is given by the following expression (15).

$$M1=\Psi 1/(if+id) \quad (15)$$

In this case, the torque Te is given by the following expression (16) similarly to the expression (14).

$$Te=M1 \cdot if \cdot iq \quad (16)$$

As is apparent from the above expression (16), the apparent or virtual flux $\Psi$d produced when the d-axis armature current id of negative polarity (i.e., the armature current for the field weakening control) is fed can be given by the following expression (17) similarly to the expression (12).

$$\Psi d=M \cdot if \quad (17)$$

Incidentally, the reluctance torque represented by the term (Ld−Lq)id·iq in the expression (11) mentioned hereinbefore can be expressed as follows:

$$(Ld-Lq)id \cdot iq=Ld \cdot id \cdot iq-Lq \cdot id \cdot iq=\Psi d \cdot iq-\Psi q \cdot id \quad (18)$$

Thus, the magnetic flux $\Psi$d due to the armature current id is considered as being outside of the magnetic flux $\Psi$o produced when the armature current id is zero.

Further, the magnetic flux $\Psi$o for the armature current id of zero becomes saturated at a low level of the latter, as can be seen in FIG. 2. Accordingly, when the flux linkage $\Psi$ for the armature current id of zero is considered in the state where the armature current id is caused to flow closely to the region preceding to the saturation, it can be considered that the operating point lies on the straight line portion of the characteristic curve representing the linear relation between the field current if and the flux linkage $\Psi$ (see the point M·if shown in FIG. 2).

To say in another way, with the field weakening control based on the d-axis armature current id, the field current if is effectively or virtually lowered, whereby the operating point is changed from the flux linkage $\Psi$o to $\Psi$1 (see FIG. 2), which means that the magnetic saturation is virtually or effectively nullified.

In the foregoing description, it has been presumed that the q-axis armature current iq assumes a fixed value. In this conjunction, it is to be noted that by changing the phase difference angle Ø (see FIG. 1) with the q-axis current value being held constant, the flux linkage $\Psi$ and hence the torque Te as produced can overall be increased although the q-axis armature current iq decreases more or less, because the influence of the magnetic saturation is mitigated by the d-axis armature current id, whereby the flux linkage $\Psi$ can correspondingly be increased.

Figure 3:
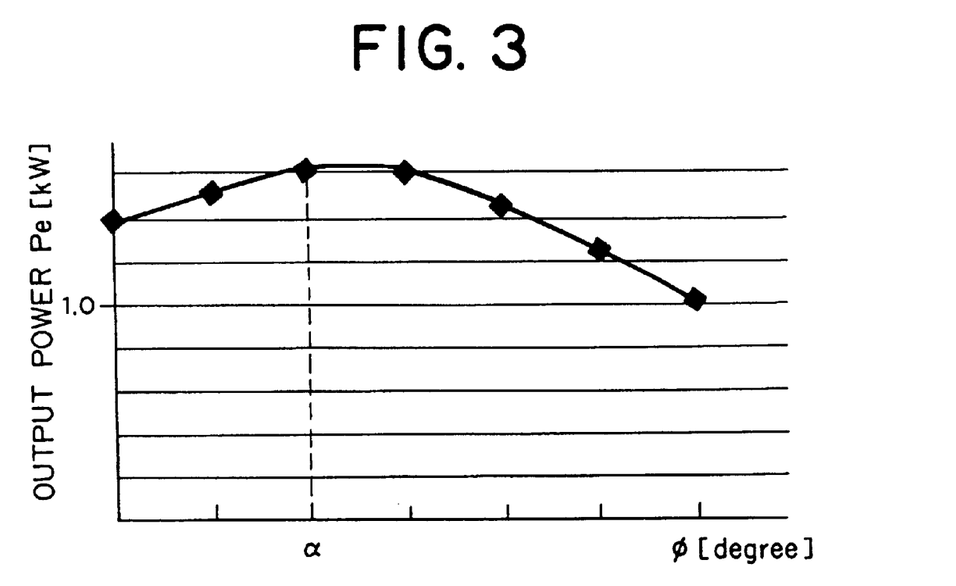
FIG. 3 is a characteristic diagram graphically illustrating a characteristic relation between a phase difference angle and an output power of the claw-pole synchronous machine when it is operated as a generator.

Next, reference is made to FIG. 3 which is a characteristic diagram graphically illustrating a characteristic relation between the phase difference angle Ø and the output power of the claw-pole synchronous machine when it is operated as the generator (i.e., in the generator operation mode). More specifically, there is shown in this figure the relation between the phase difference angle Ø and the output power Pe as measured when only the phase difference angle Ø is changed in the state where the field weakening armature current id is being fed without changing the magnitude of the armature current i while maintaining constant the rotation speed, the field current if and the terminal voltage V, respectively.

Figure 4:
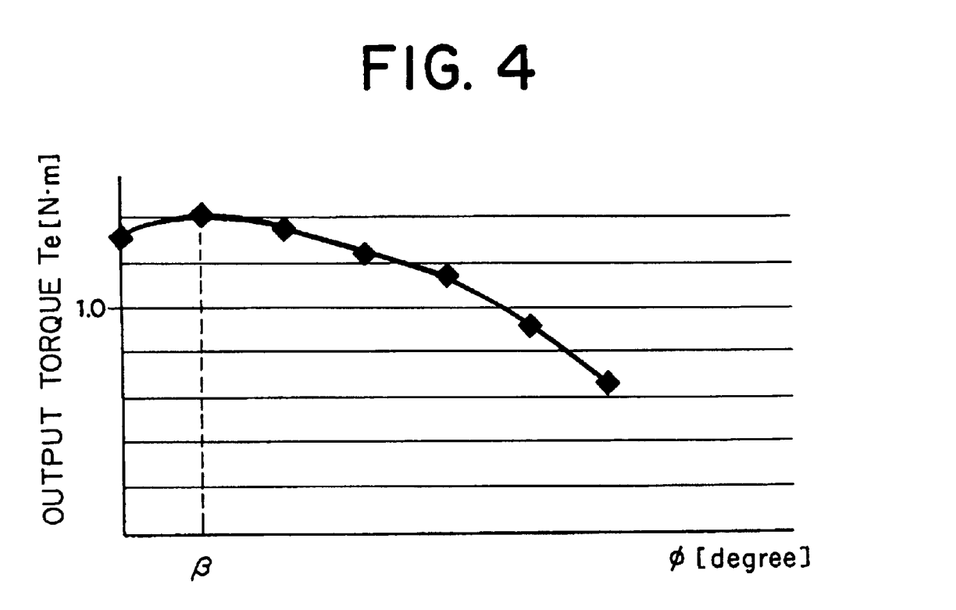
FIG. 4 is a characteristic diagram graphically illustrating a characteristic relation between the phase difference angle and the output power of the claw-pole synchronous machine when it is operated as an electric motor.
Figure 5:
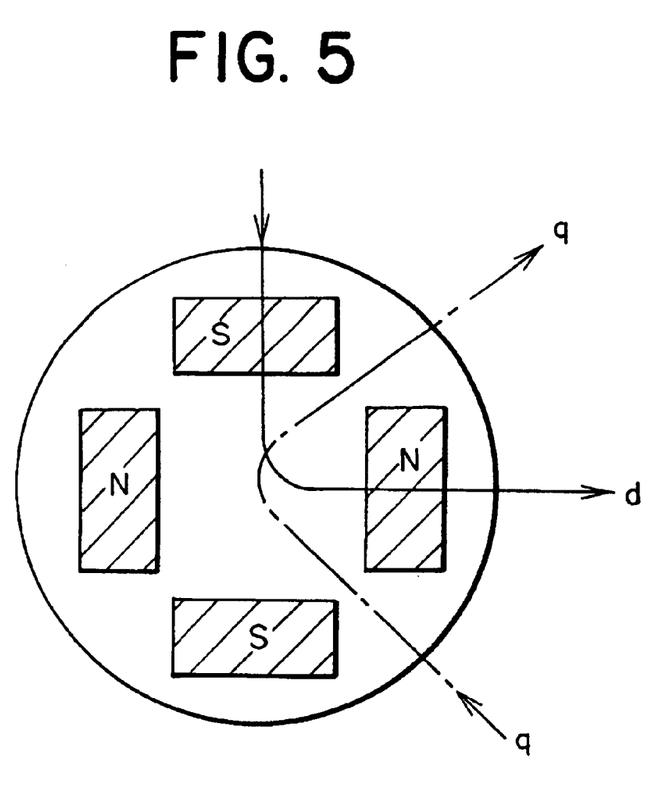
FIG. 5 is a view showing schematically and generally a structure of a conventional embedded-pole type synchronous machine.

Further, FIG. 4 is a characteristic diagram graphically illustrating a characteristic relation between the phase difference angle Ø and the output torque Te of the claw-pole synchronous machine when it is operated as the electric motor (i.e., in the motor operation mode). More specifically, there is shown in this figure the relation between the phase difference angle Ø and the output torque Te as measured when only the phase difference angle Ø is changed in the state where the field weakening armature current id is being fed without changing the magnitude of the armature current if while maintaining constant the rotation speed, the field current if and the terminal voltage V, respectively.

As can be seen in FIG. 3, when the claw-pole synchronous machine is operated as the generator, the output power generated at the phase difference angle Ø of α (≈22°) increases about 15% when compared with the output power generated at the phase difference angle Ø of zero degree.

Similarly, it can be seen from FIG. 4 that when the claw-pole synchronous machine is operated as the electric motor, the torque produced at the phase difference angle Ø of β (≈10°) increases about 10% when compared with the torque produced at the phase difference angle Ø of zero degree.

As can now be understood from the foregoing description, it is possible to increase the output power Pe and the output torque Te of the claw-pole synchronous machine by carrying out the field weakening control with the d-axis armature current id according to the teachings of the present invention. This means that the degree of freedom for regulation of the field current if can significantly be increased when compared with the conventional technique for adjusting the terminal voltage V within the inverter control enabling range by reducing only the field current if (i.e., by reducing the flux linkage Ψ) and that the claw-pole synchronous machine can be operated as the generator capable of generating a high output power or as the electric motor capable of producing high output torque up to a region of high rotation speed according to the teachings of the present invention.

Thus, by performing the field weakening control with the d-axis armature current id, high-output torque or output power can be obtained over a wide speed range with one and the same claw-pole machine and control unit in both the operation modes where the claw-pole synchronous machine is operated as the motor and the generator, respectively.

On the other hand, this means that for a same demanded torque or demanded output power, the claw-pole synchronous machine and the control unit can be implemented compactly. In other words, they can be realized in a diminished size.

Furthermore, by performing the field weakening control with the armature current id by controlling the phase difference angle Ø of the armature current in the claw-pole synchronous machine, it is possible to increase the output power of the claw-pole synchronous machine in the generator operation mode or the output torque Te thereof in the motor operation mode in dependence on the magnitude of the phase difference angle Ø when compared with the case where the phase difference angle Ø of the armature current is zero (i.e., id=0).

More specifically, by selecting the appropriate or proper phase difference angle Ø (i.e., α or β) of the armature current for the demanded output power in the generator operation mode or the demanded torque in the motor operation mode while taking into account the characteristics shown in FIG. 3 or FIG. 4, an increased output power Pe or output torque Te can be obtained with the same magnitudes of the field current if and the armature current i when compared with the conventionally adopted operation mode in which the phase difference angle Ø is zero.

In this conjunction, it should be mentioned that the command value map or table of the phase difference angle Ø referenced in performing the field weakening control of the claw-pole synchronous machine is so prepared as to contain the values of α and/or β (see FIGS. 3 and 4) which are so determined that the demanded output power or the demanded torque can be obtained with a maximum efficiency.

Many modifications and variations of the present invention are possible in the light of the techniques disclosed above. It is therefore to be understood that within the scope of the appended claims, the present invention may be practiced otherwise than as specifically described.

What is claimed is:

1. A method of controlling a claw-pole synchronous machine through a combination of a vector control of an armature voltage and an armature current supplied from an inverter power source in combination with a field current control, wherein when said claw-pole synchronous machine is operated as a generator, said field current control is performed on the basis of a demanded output power and rotation speed of said claw-pole synchronous machine while the field weakening control with said armature current is performed by controlling magnitude of said armature current and a phase difference angle thereof.

2. A method of controlling a claw-pole synchronous machine according to claim 1, wherein when said claw-pole synchronous machine is operated as the generator, a command value map is previously prepared and stored in which magnitudes of said field current and said armature current of said claw-pole synchronous machine are stored in association with a command value for said phase difference angle of said armature current in correspondence to the demanded output power and rotation speed of said claw-pole synchronous machine, and wherein the magnitudes of said field current and said armature current caused to flow through said claw-pole synchronous machine and said command value for said phase difference angle of said armature current are determined by referencing said command value map.

3. A method of controlling a claw-pole synchronous machine according to claim 2, wherein the command value for said phase difference angle of said armature current stored in said command value map is set to a value which allows said demanded output power to be generated with a maximum efficiency.

4. A method of controlling a claw-pole synchronous machine through a vector control of an armature voltage and an armature current supplied from an inverter power source in combination with a field current control, wherein when said claw-pole synchronous machine is operated as a motor, said field current control is performed on the basis of a demanded torque to be produced and a demanded rotation speed of said claw-pole synchronous machine while realizing a field weakening control with said armature current by controlling magnitude of said armature current and a phase difference angle thereof.

5. A method of controlling a claw-pole synchronous machine according to claim 4, wherein when said claw-pole synchronous machine is operated as the electric motor, a command value map is previously prepared and stored in which magnitudes of said field current and said armature current of said claw-pole synchronous machine are stored in association with a command value for said phase difference angle of said armature current in correspondence to the demanded torque and rotation speed of said claw-pole synchronous machine, and wherein the magnitudes of said field current and said armature current to be supplied to said claw-pole synchronous machine and said command value for said phase difference angle of said armature current are determined by referencing said command value map.

6. A method of controlling a claw-pole synchronous machine according to claim 5, wherein the command value for said phase difference angle of said armature current stored in said command value map is set to a value which allows said demanded torque to be generated with a maximum efficiency.

* * * * *